(12) United States Patent
Suzuka

(10) Patent No.: US 10,214,255 B1
(45) Date of Patent: Feb. 26, 2019

(54) UNDERCARRIAGE PANEL FOR INCREASING FUEL EFFICIENCY BY REDUCING DRAG OF A VEHICLE

(71) Applicant: Yoshitaka Suzuka, Sakura (JP)

(72) Inventor: Yoshitaka Suzuka, Sakura (JP)

( * ) Notice: Subject to any disclaimer, the term of this patent is extended or adjusted under 35 U.S.C. 154(b) by 0 days.

(21) Appl. No.: 15/805,011

(22) Filed: Nov. 6, 2017

(51) Int. Cl.
*B60R 19/02* (2006.01)
*B62D 35/02* (2006.01)

(52) U.S. Cl.
CPC ............ *B62D 35/02* (2013.01); *B60R 19/023* (2013.01)

(58) Field of Classification Search
CPC .............................. B62D 35/02; B60R 19/023
USPC .... 296/180.1, 181.5, 204, 193.07, 198, 1.08
See application file for complete search history.

(56) References Cited

U.S. PATENT DOCUMENTS

| | | | | |
|---|---|---|---|---|
| 4,810,021 A * | 3/1989 | Burst | ................. | B60T 5/00 296/180.1 |
| 5,692,796 A * | 12/1997 | Yamamoto | ........... | B62D 35/005 180/903 |
| 6,575,522 B2 * | 6/2003 | Borghi | ................. | B62D 35/005 296/180.1 |
| 8,807,629 B2 * | 8/2014 | Benvenuto | ........... | B62D 35/005 293/120 |
| 9,327,780 B1 * | 5/2016 | Bird | ...................... | B60R 19/023 |
| 2011/0049913 A1 * | 3/2011 | Bernt | ...................... | B60R 19/48 293/102 |
| 2013/0026783 A1 * | 1/2013 | Kakiuchi | ............... | B62D 35/02 296/180.1 |
| 2013/0257093 A1 * | 10/2013 | del Gaizo | .............. | B62D 35/02 296/180.5 |
| 2014/0238761 A1 * | 8/2014 | He | ........................ | B62D 35/02 180/89.12 |
| 2014/0299396 A1 * | 10/2014 | Tajima | ................... | B60K 11/04 180/68.1 |
| 2015/0210324 A1 * | 7/2015 | Kojima | ................ | B62D 35/005 296/180.1 |
| 2015/0225026 A1 * | 8/2015 | Ohira | ..................... | B62D 25/08 296/180.1 |
| 2016/0339970 A1 * | 11/2016 | Shibutake | ............ | B62D 35/005 |

* cited by examiner

*Primary Examiner* — Jason S Morrow
*Assistant Examiner* — E Turner Hicks
(74) *Attorney, Agent, or Firm* — FisherBroyles, LLP; Rob L. Phillips

(57) ABSTRACT

A drag-reducing undercarriage panel for a vehicle includes a planar main body sloping into an arcuate front section extending rearward over at least a portion of the planer main body creating a curved front edge; a pair of spaced outer members extending outward from opposite sides of a front portion of the planar main body; and multiple attachment sections for attaching the undercarriage panel to a vehicle. The undercarriage panel reduces or eliminates turbulent air beneath a moving vehicle caused by the vehicle's rotating front tires and uneven and rough undercarriage.

20 Claims, 5 Drawing Sheets

UNDERCARRIAGE PANEL FOR INCREASING FUEL EFFICIENCY BY REDUCING DRAG OF A VEHICLE

FIELD OF THE INVENTION

The embodiments of the present invention relate to an undercarriage panel attachable to a vehicle chassis. The undercarriage panel serves to reduce drag and increase fuel efficiency of a vehicle.

BACKGROUND

Fuel efficiency is a significant factor with automotive vehicles. Better fuel efficiency is directly related to conservation of fossil fuels and reduction of carbon emissions. Drag is a primary factor impacting fuel efficiency. Turbulent air proximate to the vehicle in motion naturally increases drag thereby reducing fuel efficiency.

Accordingly, it would be advantageous to develop an undercarriage panel configured to eliminate or reduce the turbulent air created by air flow under a vehicle.

SUMMARY

In one embodiment, the undercarriage panel for a vehicle comprises a planar main body sloping into an arcuate front section extending rearward over at least a portion of said planer main body creating a curved front edge; a pair of spaced outer members extending outward from opposite sides of a front portion of said planar main body; and multiple attachment sections for attaching said undercarriage panel to a vehicle. When attached to a vehicle, the pair of spaced outer members are positioned forward of, and aligned with the tires of the vehicle.

In one embodiment, the undercarriage panel is fabricated of a rigid, yet flexible material, such that said undercarriage panel may absorb or flex when contacting debris or obstacles while the subject vehicle is in motion.

As detailed herein, the undercarriage panel reduces or eliminates turbulent air under the vehicle while in motion by preventing (or reducing the amount of) moving air from contacting the undercarriage of the vehicle and the rotating front tires. There are at least two benefits of reducing the turbulent air under the vehicle. First, drag is reduced, and second, uninterrupted ground effects maintain a downforce (higher pressure above vehicle than underneath vehicle) causing the vehicle to traverse the ground smoothly. Both reduced drag and uninterrupted ground effects increase the fuel efficiency of the subject vehicle.

Other variations, embodiments and features of the present invention will become evident from the following detailed description, drawings and claims.

DETAILED DESCRIPTION

Figure 1A:
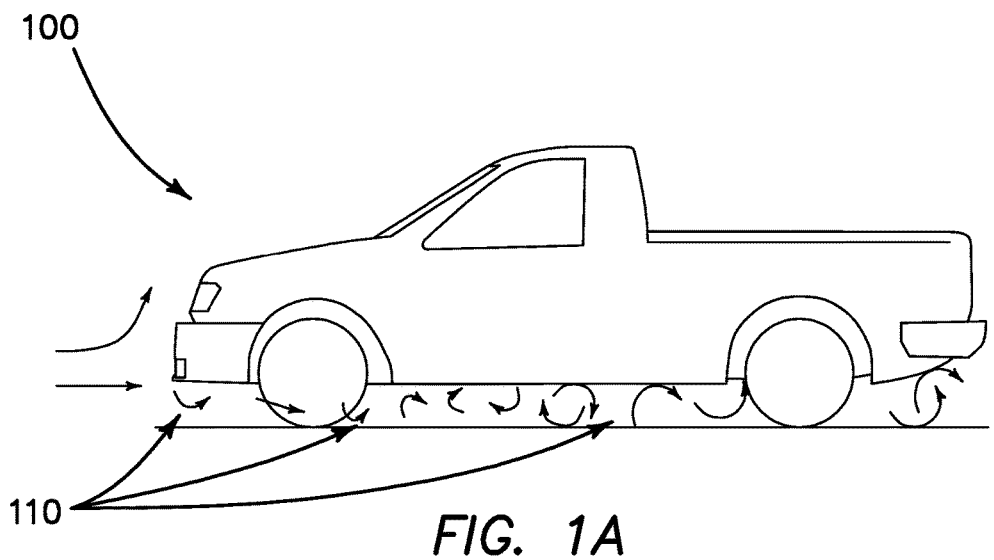
FIG. 1A illustrates turbulent air created under a vehicle in motion.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The undercarriage panel described herein may be fabricated of any number of materials including, but not limited to, plastics, composites, alloys, metals, polymers, ceramics, glasses, woods and/or combinations thereof. The canopy may be fabricated using one or more techniques including, but not limited to, machining, additive printing, forming, injection molding, casting, thermoforming and/or combinations thereof. Those skilled in the art will recognize that other materials and fabrication techniques may be used. The undercarriage panel may be fabricated as a single piece or multiple pieces attached to one another. As used herein, an undercarriage of a vehicle is made up of any vehicle parts (e.g., motor, oil pan, axle, tires, radiator, etc.) which are at the bottom of a vehicle and interact with air moving under the vehicle.

Figure 1B:
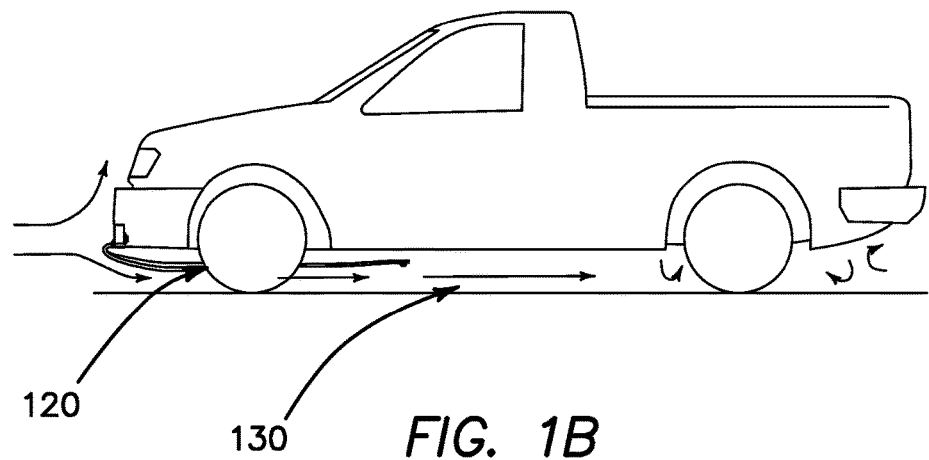
FIG. 1B illustrates an undercarriage panel attached to an underside of a vehicle chassis for reducing turbulent air according to the embodiments of the present invention.

FIG. 1A shows a standard pickup truck 100 and turbulence 110 created underneath the truck 100 while the truck is in motion. FIG. 1B shows the truck 100 and reduced/eliminated turbulence 130 resulting from the undercarriage panel 120 of the present invention being attached to the truck 100.

Figure 5A:
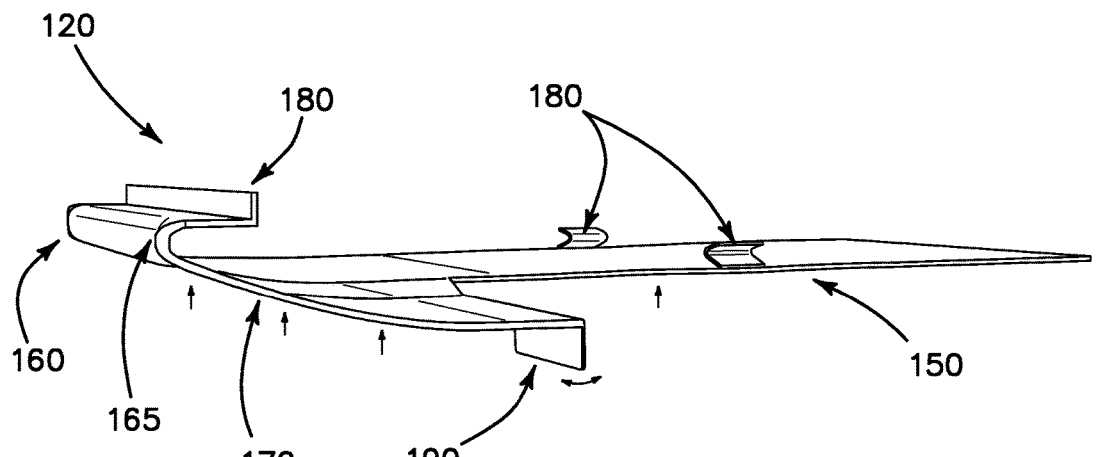
FIG. 5A illustrates a perspective side view of the undercarriage panel according to the embodiments of the present invention.
Figure 5B:
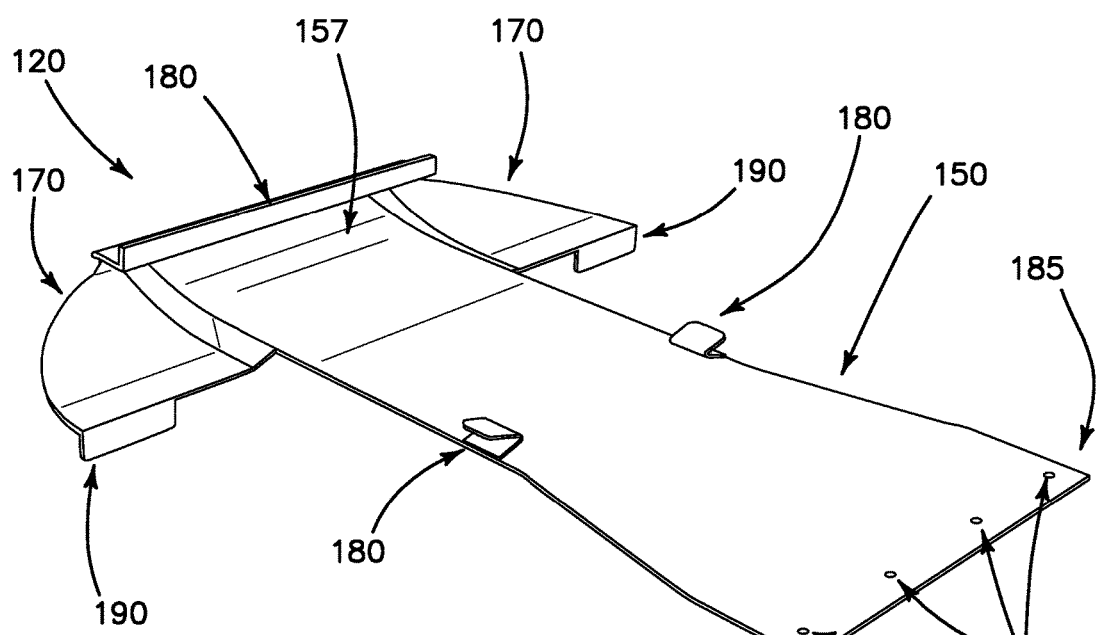
FIG. 5B illustrates a perspective upper view of the undercarriage panel according to the embodiments of the present invention.
Figure 5C:
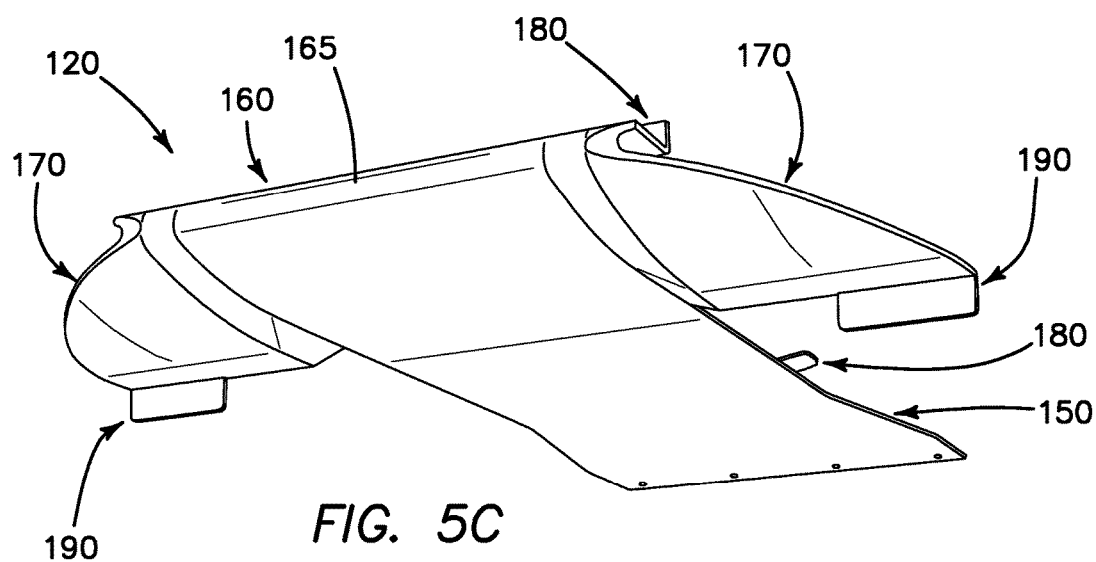
FIG. 5C illustrates a perspective bottom view of the undercarriage panel according to the embodiments of the present invention.

FIGS. 5A-5C show the undercarriage panel 120 according to the embodiments of the present invention. The undercarriage panel 120 broadly comprises a planar main body 150, a curved front edge 160, a pair of spaced outer members 170 and multiple attachment sections 180 for attaching said undercarriage panel 120 to a vehicle. The planar main body 150 slopes (FIG. 5B 157) into an arcuate front section 155 extending rearward over an upper surface of said planer main body 150 creating the curved front edge 160. The planar main body 150 shown in FIGS. 5A-5C comprises a generally uniform width along the length thereof.

Figure 4A:
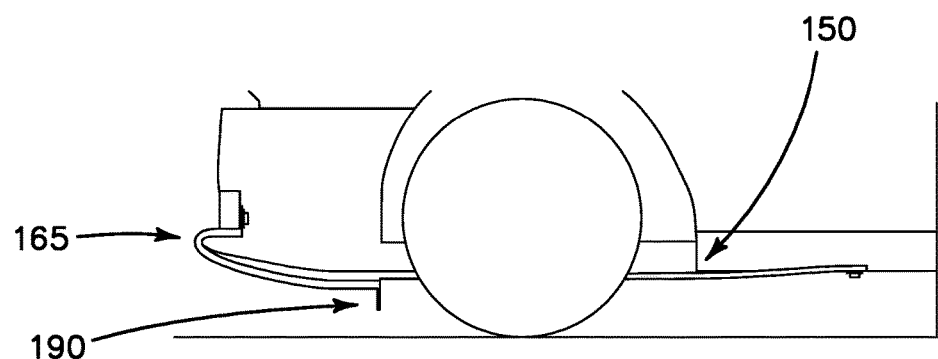
FIGS. 4A and 4B illustrate side views of a vehicle with the undercarriage panel attached to the vehicle chassis according to the embodiments of the present invention.
Figure 4B:
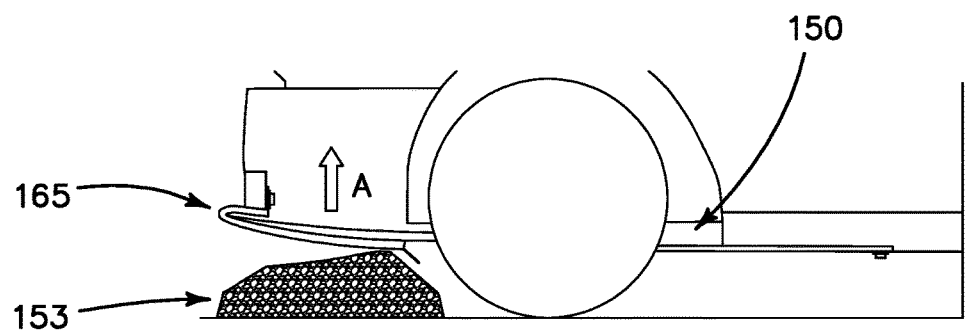

In one embodiment, the curved front edge 160 is formed such that main planer body 150 may flex thereabout. Specifically, in one embodiment, the planar main body 150 is configured to flex about a horizontal center line 165 of the curved front edge 160. FIGS. 4A and 4B show the ability of the planar main body 150 to flex upward (see arrows A) about center line 165 of the front edged 160 when contacting debris or an obstacle 153.

Figure 2:
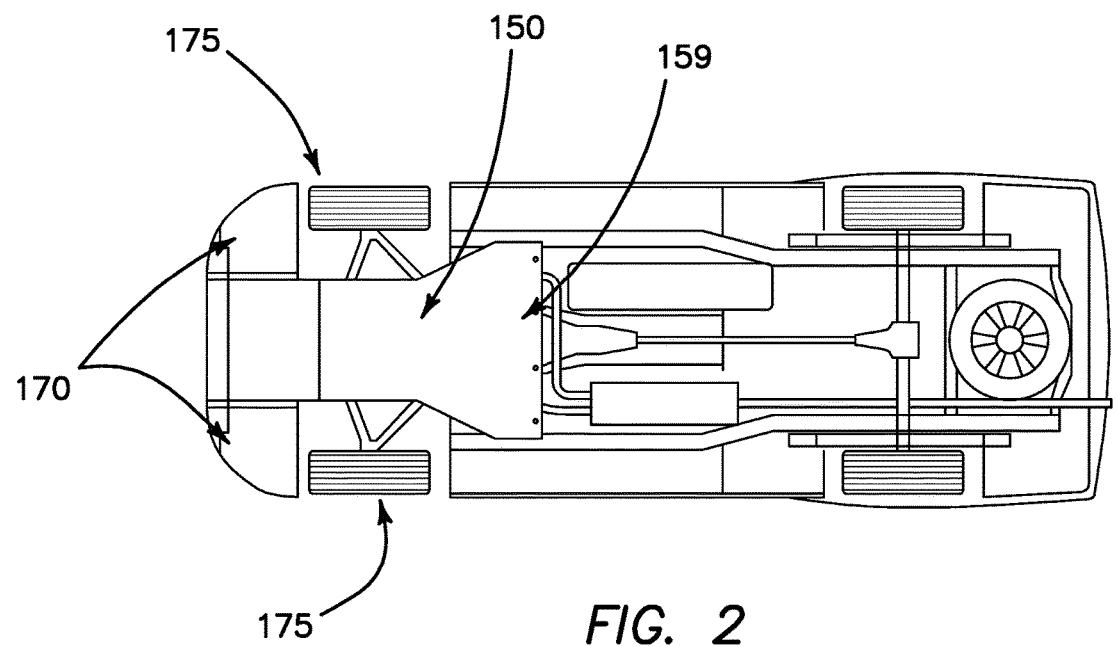
FIG. 2 illustrates an underside of a vehicle with the undercarriage panel attached to the vehicle chassis according to the embodiments of the present invention.
Figure 3:
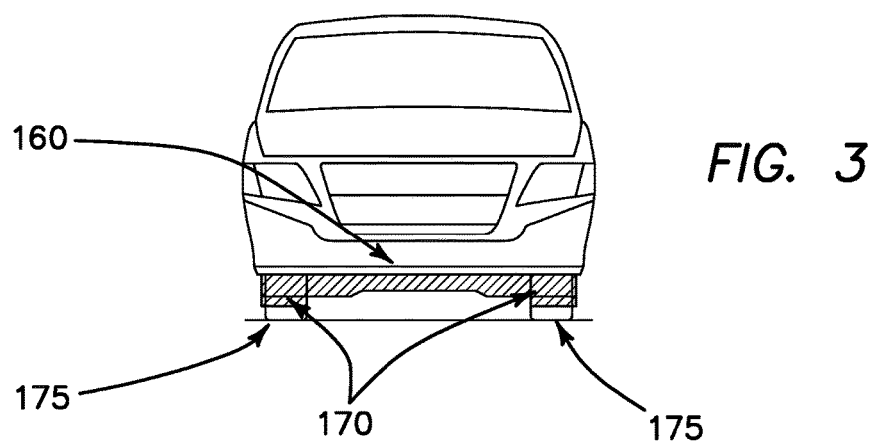
FIG. 3 illustrates a front view of a vehicle with the undercarriage panel attached to the vehicle chassis according to the embodiments of the present invention.
Figure 6:
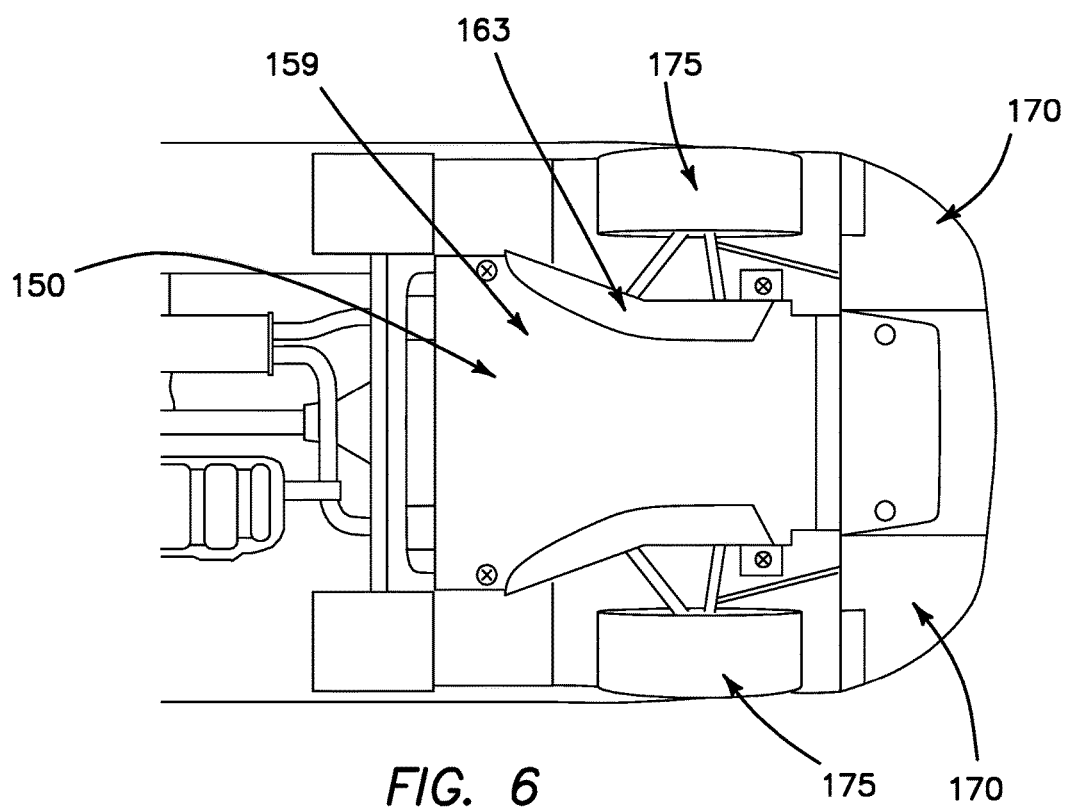
FIG. 6 illustrates an underside of a vehicle with the undercarriage panel attached to the vehicle chassis according to the embodiments of the present invention.

As best seen in FIGS. 2, 3 and 6, when the undercarriage panel 120 is attached to a vehicle, the pair of spaced outer members 170 are positioned forward of, and aligned with, the front tires 175 of the vehicle. As shown in FIGS. 5A-5C, the spaced outer members 170 are positioned below or extend downward from the planar main body 150 to re-direct as much air as possible away from the front tires 175. Flaps 190 extending downward from said spaced outer members 170 further serve to re-direct air away from the front tires 175. Given moving air contacting fast-rotating front tires creates a significant amount of turbulent air, the outer members 170 and flaps 190 reduce the formation of a significant amount of turbulent air. As shown FIGS. 2 and 6, said planar main body 150 may taper 159 wider towards a rear thereof to cover additional vehicle undercarriage. As shown in FIG. 6, the long edges 163 of the planar main body 150 may also be raised to further channel air rearward without coming into contact with significant portions of the undercarriage of the vehicle.

In one embodiment, attaching said undercarriage panel 120 to a chassis of a vehicle is accomplished using attachment sections 180 and fasteners. As shown in FIGS. 5A-5C, three attachment sections 180 comprises flaps through which fasteners may be used to attach the front and mid-portion of the undercarriage panel 120 to the chassis of the vehicle. A rear edge 185 of the undercarriage panel 120 further includes pre-drilled holes 187 through which fasteners may be used to attach the rear portion of the undercarriage panel 120 to the chassis of the vehicle.

Although the invention has been described in detail with reference to several embodiments, additional variations and modifications exist within the scope and spirit of the invention as described and defined in the following claims.

I claim:

1. A drag-reducing undercarriage panel comprising:
   a planar main body sloping into an arcuate front section extending rearward over at least a portion of said planer main body creating a curved front edge, said planar main body dimensioned to extend rearward of front tires of a vehicle to which said drag-reducing undercarriage panel is attached;
   a pair of spaced outer members extending outward from opposite sides of a front portion of said planar main body; and
   multiple attachment sections for attaching said undercarriage panel to said vehicle, said multiple attachment sections including a rearward attachment section for attaching a rearward portion of said planar main body to a point on said vehicle rearward of said front tires.

2. The drag-reducing undercarriage panel of claim 1 further comprising flaps extending downward from said pair of spaced outer members.

3. The drag-reducing undercarriage panel of claim 1 wherein said pair of spaced outer members are positioned below said planar main body.

4. The drag-reducing undercarriage panel of claim 1 wherein said multiple attachment sections comprise: (i) a front flap extending at least a portion of the width of the front edge and (ii) two flaps extending upward from approximate mid-points along said planar main body.

5. The drag-reducing undercarriage panel of claim 1 wherein said planar main body tapers wider in a rearward direction.

6. The drag-reducing undercarriage panel of claim 1 wherein said planar main body includes a pair of raised long edges are raised.

7. A drag-reducing undercarriage panel comprising:
   a planar main body sloping into an arcuate front section extending rearward over at least a portion of said planer main body creating a curved front edge, said planar main body dimensioned to extend rearward of front tires of a vehicle to which said drag-reducing undercarriage panel is attached;
   a pair of spaced outer members extending outward from opposite sides of a front portion of said planar main body;
   multiple attachment sections for attaching said undercarriage panel to said vehicle, said multiple attachment sections including a rearward attachment section for attaching a rearward portion of said planar main body to a point on said vehicle rearward of said front tires; and
   wherein said curved front edge is configured to allow said planar main body to flex upward and downward thereabout.

8. The drag-reducing undercarriage panel of claim 7 wherein said planar main body may flex upward and downward about a horizontal centerline of said curved front edge.

9. The drag-reducing undercarriage panel of claim 7 further comprising flaps extending downward from said pair of spaced outer members.

10. The drag-reducing undercarriage panel of claim 7 wherein said pair of spaced outer members are positioned below said planar main body.

11. The drag-reducing undercarriage panel of claim 7 wherein said multiple attachment sections comprise: (i) a front flap extending at least a portion of the width of the front edge and (ii) two flaps extending upward from approximate mid-points along said planar main body.

12. The drag-reducing undercarriage panel of claim 7 wherein said planar main body tapers wider in a rearward direction.

13. The drag-reducing undercarriage panel of claim 1 wherein said planar main body includes a pair of raised long edges.

14. A vehicle comprising:
    a body;
    a chassis;
    at least four tires comprising two front tires and two rear tires; and
    a drag-reducing undercarriage panel comprising:
      a planar main body sloping into an arcuate front section extending rearward over at least a portion of said planer main body creating a curved front edge, said planar main body covering at least a portion of said undercarriage, said planar main body dimensioned to extend, and attach to a point on said vehicle, rearward of said front tires; and
      a pair of spaced outer members extending outward from opposite sides of a front portion of said planar main body and positioned forward of, and aligned with, said front tires.

15. The vehicle of claim 14 wherein said curved front edge is positioned below a front bumper of said vehicle.

16. The vehicle of claim 14 wherein said planar main body may flex upward and downward about a horizontal centerline of said curved front edge.

17. The vehicle of claim 14 further comprising flaps extending downward from said pair of spaced outer members.

18. The vehicle of claim 14 wherein said pair of spaced outer members are positioned below said planar main body.

19. The vehicle of claim 14 wherein said planar main body tapers wider in a rearward direction.

20. The drag-reducing undercarriage panel of claim 1 wherein said planar main body includes a pair of raised long edges.

\* \* \* \* \*